Nov. 29, 1960     V. MEIER     2,962,184
INFLATABLE AIRCRAFT ENGINE SHIELDS
Filed April 28, 1959
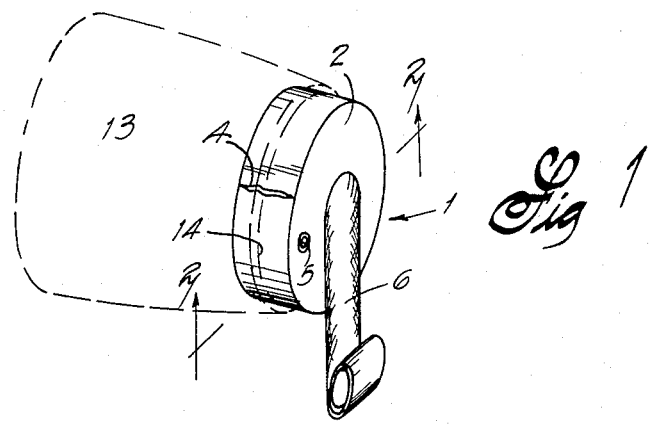
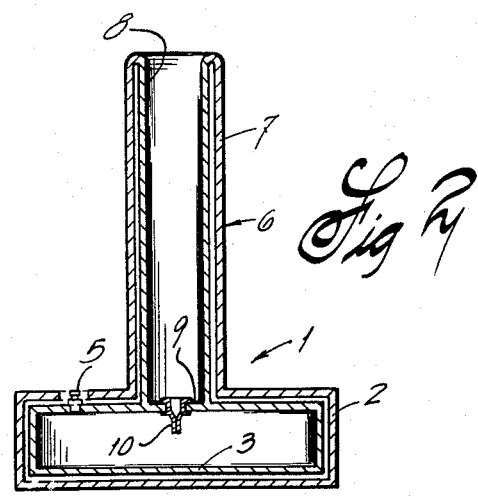
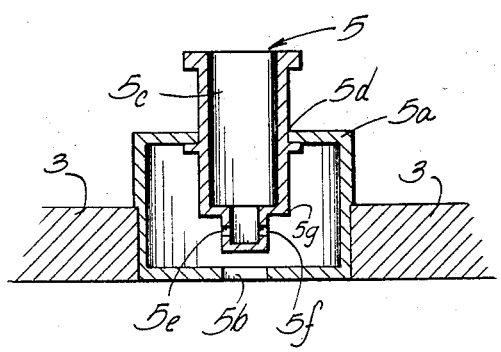
INVENTOR.
Vincent Meier
BY Arthur L. Collins
Attorney

United States Patent Office 2,962,184
Patented Nov. 29, 1960

2,962,184

INFLATABLE AIRCRAFT ENGINE SHIELDS

Vincent Meier, Port Washington, N.Y., assignor to the United States of America as represented by the Secretary of the Navy Filed Apr. 28, 1959, Ser. No. 809,582

2 Claims. (Cl. 220—24.5)

This invention relates to an inflatable shielding device for closing the engine ducts of aircraft when said engine is not in use.

It is desirable to protect the jet intake and exhaust ducts, engine cowl openings, and the like from dust, water, dirt, etc., which otherwise might settle therein. Under the prior art, shields of this nature have generally been made of plywood, metal, and similar materials so that they were heavy, bulky and hard to handle. A warning streamer, attached to these shields, prevents the inadvertent starting of the aircraft engine while the shields were in place.

An object of this invention is to provide an inflatable shield of light weight and small bulk having a low pressure inflatable shape to fit the various size openings and providing its own gasket through inflation.

Another object of this invention is to provide a warning streamer adapted to force air into the shield to be inflated, and which when not in use can be rolled up into a compact package and can be used as a carrying case for the entire device.

Yet another object of this invention is the elimination of metallic fittings whereby the shields can be placed into position and removed therefrom much more quickly and easily than the shields known to the prior art.

A further object of this invention is to provide a device which compensates for variations in pressure due to temperature changes.

Other objects and many of the attendant advantages of this invention will be readily appreciated as the same becomes better understood by reference to the following detailed description:

Figure 1 is a perspective view of a shield having the warning streamer used to inflate the shield secured thereto, and mounted in a suitable aircraft engine opening;

Figure 2 is a view along line 2—2 of Figure 1 showing a one way flutter valve connecting the bladder;

Figure 3 shows the engine shield rolled up for storage in a small space;

Figure 4 is a detailed view of the exhaust valve.

Referring to the various figures of the drawing, there is shown in Figure 1 an engine shield 1 positioned in an opening 14 of an aircraft 13. The shield consists of the outer casing 2 and the bladder 3 which is normally positioned within the casing. The general configuration of the bladder 3 is preferably substantially the same as that of the outer casing 2. Opening 4 in the casing provides a convenient means whereby the bladder may be easily inserted or removed and replaced. As will be apparent in the drawing, opening 4 is closed automatically when the bladder is inflated such that no zipper or lacing or the like is required.

The exhaust valve 5 in bladder 3 includes the small cylindrical housing 5a which is positioned over the aperture 5b in the bladder and the tubular plunger element 5c which is slidably adjustable in the housing aperture 5d. Ports 5e and 5f through the reduced diameter extremity of plunger 5c allow escape of the pressurized air or other fluid from the interior of the bladder, through aperture 5b into the interior of housing 5a and through the ports and the interior of the tubular plunger to the atmosphere. When the valve 5 is operated to its closed position, the reduced diameter extremity of the plunger 5c extends through aperture 5b, and the shoulder 5g of plunger 5c engages the internal peripheral rim of aperture 5b.

The combination warning streamer and pump 6 includes an outer casing 7 and a lining 8. The lining of the streamer is permanently attached by electronic sealing, heat sealing, cementing, vulcanizing or like means to bladder 3 of the shield. The casing 7 for the pump streamer 6 is in like manner attached to the casing 2 of the shield. Each component of the streamer is thus an extension of each component of the shield.

The pump streamer 6 at its inner end 9 is provided with a one-way valve such as the flutter valve 10 which is disposed between the interior of the streamer and the interior of the bladder 3 in the shield. This arrangement permits the flow of air from the interior of the streamer into the bladder, however, it prohibits any flow in the opposite direction.

The primary purpose of the present invention is to provide means whereby a large low pressure pneumatic aircraft engine shield may be easily and quickly inflated. When the pump-streamer 6 is fully extended, it takes the form of a similar tubular sleeve that extends upwardly from the shield 1. Upon closing the top of the sleeve by folding or gathering it tightly in the hand, a quantity of air is entrapped. If the hand pressure closing the top of the pump-streamer is maintained as the streamer is compressed by rolling, folding or squeezing it, the entrapped air will be forced into the bladder 3 of the shield 1 to inflate it. The shield is then positioned in the duct opening of an aircraft engine 13, and the pumping process is repeated as often as is necessary to product a tight fit. To remove the shield from the duct openings, air is bled from the shield through the exhaust valve 5 by pulling out the valve plunger 5c. When the shield is completely deflated, it can be rolled up into the small compact package shown in Figure 3 within the pump streamer 6.

Obviously many modifications and variations of the present invention are possible in the light of the above teachings. It is therefore to be understood that within the scope of the appended claims the invention may be practiced otherwise than as specifically described herein.

What is claimed is:

1. An inflatable engine shield for plugging jet intake and exhaust ducts of aircraft to protect said ducts against the invasion of dust, water, and other such foreign matter when the aircraft is standing idle on the ground said engine shield comprising a resilient outer casing having a substantially circular shape; a low pressure inflatable bladder disposed within the casing; a flexible elongated open-ended sleeve extending upwardly from the bladder through the casing whereby air may be forced into the bladder by rolling up the sleeve; a one way valve means disposed between the interior of the bladder and the interior of the sleeve for allowing air to be directed from the sleeve into the bladder and preventing the passage of the air from the bladder into the sleeve; exhaust means for deflating the bladder.

2. An inflatable engine shield according to claim 1 wherein the exhaust means comprises a cylindrical housing, said housing having a port on its side adjacent the bladder; a hollow piston in said chamber, having a port in its upper portion connecting the interior of the piston with the atmosphere, and having two ports on the lower portion of the piston which connect the interior of the piston with the housing, said lower portion is of reduced diameter which makes this port slidably adjustable within the port in the housing so that when the piston is in its closed position its lower end extends into the housing port thereby prohibiting any escape of air from the bladder.

References Cited in the file of this patent

UNITED STATES PATENTS

| | | |
|---|---|---|
| 1,506,418 | Evensta | Aug. 26, 1924 |
| 2,678,666 | Theis | May 18, 1954 |
| 2,714,898 | Reese | Aug. 9, 1955 |
| 2,760,367 | Stromberg | Aug. 28, 1956 |

FOREIGN PATENTS

| | | |
|---|---|---|
| 1,625 | Great Britain | 1863 |